(12) United States Patent
Gao et al.

(10) Patent No.: US 11,109,323 B2
(45) Date of Patent: Aug. 31, 2021

(54) CHANNEL CONFIGURATION METHOD AND APPARATUS, POWER CONTROL METHOD AND APPARATUS, USER EQUIPMENT, BASE STATION AND STORAGE MEDIUM

(71) Applicant: ZTE Corporation, Guangdong (CN)

(72) Inventors: Bo Gao, Guangdong (CN); Zhaohua Lu, Guangdong (CN); Shujuan Zhang, Guangdong (CN); Hao Wu, Guangdong (CN); Chuangxin Jiang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/093,242

(22) Filed: Nov. 9, 2020

(65) Prior Publication Data
US 2021/0058873 A1    Feb. 25, 2021

Related U.S. Application Data

(63) Continuation of application No. PCT/CN2019/086023, filed on May 8, 2019.

(30) Foreign Application Priority Data

May 11, 2018   (CN) .......................... 201810449681.8

(51) Int. Cl.
*H04W 52/24*   (2009.01)
*H04L 25/02*   (2006.01)
(Continued)

(52) U.S. Cl.
CPC ....... *H04W 52/146* (2013.01); *H04L 25/0226* (2013.01); *H04W 52/242* (2013.01);
(Continued)

(58) Field of Classification Search
None
See application file for complete search history.

(56) References Cited

U.S. PATENT DOCUMENTS

| 9,578,628 B2 | 2/2017 | Zhong et al. |
| 10,028,263 B2 | 7/2018 | Wu et al. |

(Continued)

FOREIGN PATENT DOCUMENTS

| CN | 102355340 A | 2/2012 |
| CN | 103095395 A | 5/2013 |

(Continued)

OTHER PUBLICATIONS

International Search Report and Written Opinion issued in International Patent Application No. PCT/CN2019/086023, dated Aug. 9, 2019, 8 pages.

(Continued)

*Primary Examiner* — Saba Tsegaye
(74) *Attorney, Agent, or Firm* — Perkins Coie LLP

(57) ABSTRACT

Provided are channel configuration and power control methods and devices, a user equipment, a base station and storage mediums. The channel configuration method is configured to receive a second channel characteristic assumption of a control channel resource set configured by a second communication node; where the control channel resource set is formed by at least one of a first type of search space and a second type of search space; the second channel characteristic assumption is used for configuration of control channel resources in the second type of search space; and the control channel resource transmitted by the second communication node are received according to the second channel characteristic assumption.

12 Claims, 9 Drawing Sheets

(51) Int. Cl.
*H04W 72/04* (2009.01)
*H04W 76/27* (2018.01)
*H04W 52/14* (2009.01)
*H04W 80/02* (2009.01)

(52) U.S. Cl.
CPC ..... *H04W 72/042* (2013.01); *H04W 72/0453* (2013.01); *H04W 76/27* (2018.02); *H04W 80/02* (2013.01)

(56) References Cited

U.S. PATENT DOCUMENTS

| | | |
|---|---|---|
| 2014/0286274 A1 | 9/2014 | Liu et al. |
| 2016/0219534 A1 | 7/2016 | Hao et al. |
| 2019/0044681 A1* | 2/2019 | Zhang ................... H04B 7/0408 |
| 2019/0190747 A1* | 6/2019 | Park .................... H04L 25/0226 |
| 2020/0059867 A1* | 2/2020 | Haghighat .......... H04W 52/367 |

FOREIGN PATENT DOCUMENTS

| | | |
|---|---|---|
| CN | 103249147 A | 8/2013 |
| RU | 2620586 C1 | 5/2017 |
| WO | 2011035726 A1 | 3/2011 |

OTHER PUBLICATIONS

VIVO: "Remaining issues on non-CA UL power control", 3GPP Draft; R1-1803842 Remaining Issues On Non-Da UL Power Control, 3RD Generation Partnership Project (3GPP), Mobile Competence Centre; 650, Route Des Lucioles ; F-06921 Sophia-Antipolis Cedex; FRA vol. RAN WG1, No. Sanya, China; 20180416-20180420 Apr. 15, 2018 (Apr. 15, 2018), XP051426137, Retrieved from the Internet: URL:http://www.3gpp.org/ftp/Meetings%5F3GPP%5FSYNC/RAN1/Docs/ [retrieved on Apr. 15, 2018], 5 pages.

European Search Report in European Patent Application No. EP19799322.3, dated May 17, 2021, 10 pages.

\* cited by examiner

| | |
|---|---|
| SRI=0: | P0/alpha/reference signal index/closed-loop power control index |
| SRI=1: | P0/alpha/reference signal index/closed-loop power control index |
| | ... ... |
| SRI=n-1: | P0/alpha/reference signal index/closed-loop power control index |

FIG. 11

| | |
|---|---|
| SRI=0: | P0 and alpha set index |
| | PL reference signal resource index |
| | Closed-loop power control index |
| SRI=1: | P0 and alpha set index |
| | PL reference signal resource index |
| | Closed-loop power control index |
| | ... ... |
| SRI=n-1: | P0 and alpha set index |
| | PL reference signal resource index |
| | Closed-loop power control index |

FIG. 12

CHANNEL CONFIGURATION METHOD AND APPARATUS, POWER CONTROL METHOD AND APPARATUS, USER EQUIPMENT, BASE STATION AND STORAGE MEDIUM

CROSS REFERENCE TO RELATED APPLICATIONS

This patent document is a continuation of and claims priority to International Patent Application No. PCT/CN2019/086023, filed on May 8, 2019, which claims the benefit of priority of Chinese patent application No. 201810449681.8 filed on May 11, 2018 with the Chinese Patent Office. The entire contents of the before-mentioned patent applications are incorporated by reference as part of the disclosure of this patent document.

TECHNICAL FIELD

The present invention relates to the field of communication, for example, to channel configuration and power control methods and devices, a user equipment, a base station and storage mediums.

BACKGROUND

High-frequency bands with ultra wide bandwidths (i.e., millimeter wave communication) become an important mobile communication development direction in the future and attract the attention of the global academia and industry. Particularly, with increasingly congested spectrum resources and massive accesses to physical networks in the present, advantages of millimeter waves become increasingly attractive. Corresponding standardization work has been started in many standard organizations such as an Institute of Electrical and Electronics Engineers (IEEE) and a 3rd Generation Partnership Project (3GPP). For example, in 3GPP standard groups, high-frequency band communication becomes an important innovation point of a 5G New Radio Access Technology (New RAT) due to its significant advantage of wide bandwidths.

In an existing 5G communication system, since constraints of analog beam scheduling need to be considered, only resource of one analog beam dimension can be effectively scheduled in sending of a control channel, a data channel and a reference signal. However, in actual transmission, due to the need to support flexible scheduling, more than one control channels, data channels and reference signals need to be sent or received at the same time to maximize transmission performance. For the above-mentioned technical problem, a solution of supporting simultaneous sending and receiving of a plurality of control channels, data channels and reference signals is not proposed in the existing art.

SUMMARY

Embodiments of the present invention provide channel configuration and power control methods and devices, a user equipment, a base station, and storage mediums, aiming to solve the problem of a lack of a solution that supports simultaneous sending and receiving of a plurality of control channels, data channels and reference signals in the existing art.

In order to solve the above technical problem, embodiments of the present invention provide a channel configuration method. The method includes: receiving a second channel characteristic assumption of a control channel resource set configured by a second communication node; where the control channel resource set is formed by a first type of search space and/or a second type of search space; the second channel characteristic assumption is used for configuration of control channel resources in the second type of search space; and receiving the control channel resources sent by the second communication node according to the second channel characteristic assumption.

Embodiments of the present invention further provide a channel configuration method. The method includes: configuring a second channel characteristic assumption of the control channel resource set and sending the second channel characteristic assumption of the control channel resource set to a first communication node; where the control channel resource set is formed by a first type of search space and/or a second type of search space; the second channel characteristic assumption is used for configuration of control channel resources in the second type of search space; and sending the control channel resources to the first communication node.

Embodiments of the present invention further provide a channel configuration method. The method includes: receiving a channel characteristic assumption of uplink control channel resources configured by the second communication node; and sending an uplink control channel associated with the uplink control channel resources to the second communication node according to the channel characteristic assumption of the uplink control channel resources.

Embodiments of the present invention further provide a channel configuration method. The method includes: configuring the channel characteristic assumption of uplink control channel resources and sending the second channel characteristic assumption of the control channel resource set to the first communication node; and receiving the uplink control channel associated with the uplink control channel resources sent by the first communication node according to the channel characteristic assumption of the uplink control channel resources.

Embodiments of the present invention further provide a channel power control method. The method includes: receiving a first type of Media Access Control-Control Element (MAC-CE) signaling sent by the second communication node; and determining a power control parameter of a Physical Uplink Shared Channel (PUSCH) according to the first type of MAC-CE signaling.

Embodiments of the present invention further provide a channel power control method. The method includes: generating the first type of MAC-CE signaling; where the first type of MAC-CE signaling is used to determine the power control parameters of the PUSCH; and transmitting the first type of MAC-CE signaling to the first communication node.

Embodiments of the present invention further provide a channel configuration device. The device includes: a first characteristic receiving module configured to receive a second channel characteristic assumption of a control channel resource set configured by the second communication node; where the control channel resource set is formed by the first type of search space and/or the second type of search space; and the second channel characteristic assumption is used for configuration of control channel resources in the second type of search space; and a first resource receiving module configured to receive the control channel resource sent by the second communication node according to the second channel characteristic assumption.

Embodiments of the present invention further provide a channel configuration device. The device includes: a first characteristic sending module configured to configure a second channel characteristic assumption of a control channel resource set and send the second channel characteristic assumption of the control channel resource set; where the control channel resource set is formed by the first type of search space and/or the second type of search space; the second channel characteristic assumption is used for configuration of control channel resources in the second type of search space; and a first resource sending module configured to transmit the control channel resource to the first communication node.

Embodiments of the present invention further provide a channel configuration device. The device includes: a second characteristic receiving module configured to receive a channel characteristic assumption of uplink control channel resources configured by the second communication node; and a second resource sending module configured to transmit an uplink control channel associated with the uplink control channel resources to the second communication node according to the channel characteristic assumption of the uplink control channel resources.

Embodiments of the present invention further provide a channel configuration device. The device includes: a second characteristic sending module configured to configure a second channel characteristic assumption of a control channel resource set and send the second channel characteristic assumption of the control channel resource set; and a second resource receiving module configured to receive the uplink control channel associated with the uplink control channel resources sent by the first communication node according to the channel characteristic assumption of the uplink control channel resources.

Embodiments of the present invention further provide a channel power control device. The device includes: a signaling receiving module configured to receive a first type of MAC-CE signaling transmitted by the second communication node; and a power determining module configured to determine a power control parameter of a PUSCH according to the first type of MAC-CE signaling.

Embodiments of the present invention further provide a channel power control device. The device includes: a signaling generating module configured to generate the first type of MAC-CE signaling; where the first type of MAC-CE signaling is used to determine the power control parameters of the PUSCH; and a signaling sending module configured to transmit the first type of MAC-CE signaling to the first communication node.

Embodiments of the present invention further provide a user equipment. The user equipment includes a first processor, a first memory and a first communication bus. The first communication bus is configured to implement connection communication between the first processor and the first memory; and the first processor is configured to execute computer programs stored in the first memory to perform steps of the above-mentioned channel configuration method or channel power control method.

Embodiments of the present invention further provide a base station. The base station includes a second processor, a second memory and a second communication bus. The second communication bus is configured to implement connection communication between the second processor and the second memory; and the second processor is configured to execute computer programs stored in the second memory to implement the steps of the above-mentioned channel configuration method or channel power control method.

The Embodiments of the present invention further provide a computer-readable storage medium. The computer-readable storage medium is configured to store one or more computer programs, where the one or more computer programs are executable by one or more processors to implement the steps of the above-mentioned channel configuration method, or channel power control method.

Embodiments of the present invention have the following beneficial effects.

Embodiments of the present invention provide channel configuration and power control methods and devices, a user equipment, a base station and storage mediums. A second channel characteristic assumption of the control channel resource set configured by the second communication node is received, where the control channel resource set is formed by the first type of search space and/or the second type of search space, and the second channel characteristic assumption is used for configuration of control channel resources in the second type of search space; and a control channel resource sent by the second communication node is received according to the second channel characteristic assumption. Therefore, the scheduling of channel resources is achieved by providing the second channel characteristic assumption, so that coordination among a plurality of control channels, data channels and reference signals is carried out, thereby effectively achieving simultaneous scheduling of the plurality of control channels, data channels, and reference signals, and significantly improving the system performance.

Other features and corresponding beneficial effects of embodiments of the present invention are set forth later in the Description, and it should be understood that at least part of the beneficial effects become apparent from the Description of the present application.

BRIEF DESCRIPTION OF DRAWINGS

FIG. 11 is a schematic diagram illustrating a signaling format of Media Access Control-Control Element (MAC- CE) configuration power control parameters related to respective embodiments of the present invention;

FIG. 12 is a schematic diagram illustrating a signaling format of MAC-CE configuration power control parameters related to respective embodiments of the present invention;

DETAILED DESCRIPTION

To illustrate the objects, solutions and advantages of the present application clearer, embodiments of the present invention will be described below in detail in conjunction with the embodiments and drawings. It is to be understood that the embodiments described herein are merely intended to explain the present application and not to limit the present application.

Figure 1:
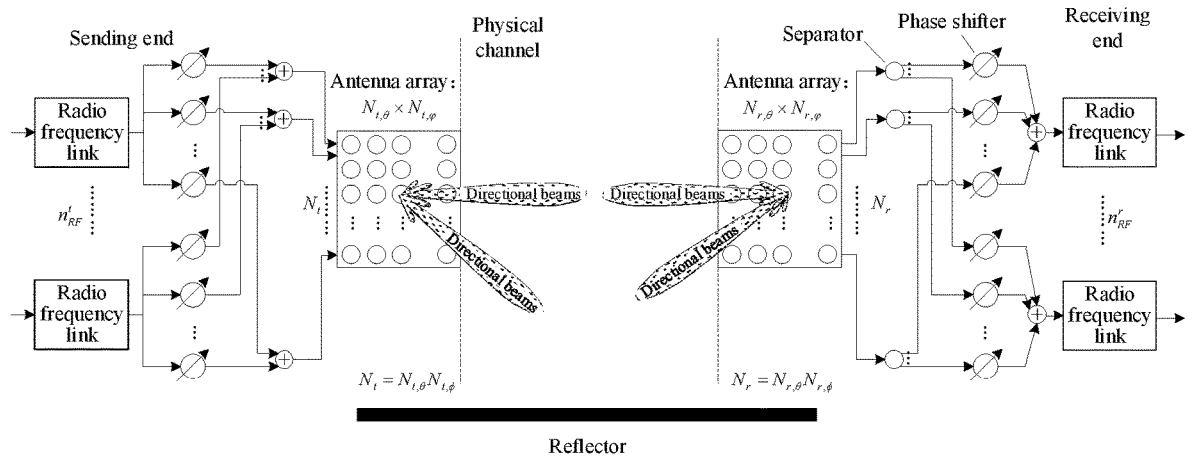
FIG. 1 is a schematic diagram illustrating a structure of a hybrid precoding transceiver provided by respective embodiments of the present invention.

FIG. 1 is a structure diagram of a transceiver for hybrid precoding (hybrid analog and digital beamforming) according to the present application. A sending end and a receiving end of a system are configured with a plurality of antenna units and a plurality of radio frequency links. Each radio frequency link is connected to an antenna array unit (a partial connection scenario is not excluded), and each antenna unit has a digital keying phase shifter. A high-frequency band system implements beamforming of an analog end by loading different phase shifts on signals of respective antenna units. Specifically, in a hybrid beamforming transceiver, there exists a plurality of radio frequency signal streams. Each signal stream is loaded with a precoding antenna weight vector (AWV) via the digital keying phase shifter, and sent from the plurality of antenna units to a high-frequency band physical propagation channel. At the receiving end, radio frequency signal streams received by the plurality of antenna units are weighted and combined into a single signal stream, and after radio frequency demodulation is performed at the receiving end, a receiver finally obtains a plurality of received signal streams, which are sampled and received by a digital baseband.

The User Equipment (UE) end receives a channel characteristic assumption of a control channel resource set configured by a base station end, and the control channel resource set is formed of a first type of search space and/or a second type of search space. The channel characteristic assumption acts on the second type of search space, and the control channel resource set refers to a downlink control channel resource set. To describe the expression, in the embodiments of the present invention, the UE is also called a first communication node, and the base station is also called a second communication node.

In addition, the first type of search space is a common search space, or beam recovery search space. Specifically, the common search space includes, but is not limited to:
1) Type0-PDCCH (Physical Downlink Control Channel) common search space;
2) Type0A-PDCCH common search space;
3) Type1-PDCCH common search space;
4) Type2-PDCCH common search space; and
5) Type3-PDCCH common search space.

The first type of search space does not require an explicit configuration of channel state information. Instead, the channel characteristic assumption of the first type of search space is determined via predefined criteria. For example, the correspondence between the first type of search space and a downlink reference signal (such as synchronization reference signal SS/PBCH) is configured, and when the UE desires to receive the search space, the channel characteristic assumption needs to be assumed according to the correspondence, that is, the received beam information of the UE end is determined.

For the beam recovery search space, the monitoring window starts from a time instant, when the first communication node transmits a Physical Random Access Channel (PRACH), plus offset time, to a time instant when the first communication node receives the channel characteristic assumption reconfiguration for a downlink control channel. In addition, the corresponding channel characteristic assumption is based on the downlink reference signal associated with the PRACH reported by the UE.

In addition, the second type of search space refers to a user-specific search space, of which the channel characteristic assumption information is determined via the explicit configuration signaling of the base station. Further, the channel characteristic assumption refers to: quasi co-location (QCL), or spatial QCL, or transmission configuration indication (TCI). Further, the channel characteristics hypothesis is used for beam indication.

The reference signal of embodiments of the present invention includes at least one of the following:
1) Channel state information reference signal (CSI-RS);
2) Channel state information interference measurement signal (CSI-IM);
3) Demodulation reference signal (DMRS);
4) Downlink demodulation reference signal (DL DMRS);
5) Uplink demodulation reference signal (UL DMRS);
6) Channel sounding reference signal (SRS)
7) Phase tracking reference signal (PT-RS);
8) Random access channel signal (RACH);
9) Synchronization signal (SS);
10) Synchronization signal block (SS block);
11) Primary synchronization signal (PSS); or
12) Secondary synchronization signal (SSS).

The beam may be a resource (e.g., a sending end spatial filter, a receiving end spatial filter, a sending end precoding, a receiving end precoding, an antenna port, an antenna weight vector and an antenna weight matrix). A beam sequence number may be replaced with a resource index (e.g., a reference signal resource index), since the beam may be bound to some time-frequency code resources for transmission. The beam may also be a transmission (sending/ receiving) manner. The transmission manner may include space division multiplexing, frequency-domain/time-domain diversity and the like.

Furthermore, the base station end may perform Quasi co-location configuration for two reference signals and inform the UE end to describe the channel characteristic assumption. Parameters related to the Quasi co-location at least include: Doppler spread, Doppler shift, delay spread, average delay, average gain and spatial parameters, where the spatial parameters may include spatial receiving parameters, such as an angle of arrival, a spatial correlation of the received beam, an average delay and a time-frequency channel response correlation (including phase information).

Embodiment One

Figure 2:
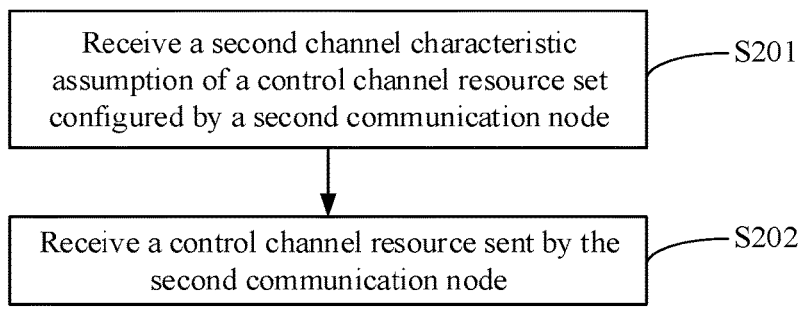
FIG. 2 is a flowchart illustrating a channel configuration method provided by Embodiment One of the present invention.

Referring to FIG. 2, FIG. 2 is a flowchart illustrating a channel configuration method provided by Embodiment One of the present invention. The method includes the following steps.

In S201, a second channel characteristic assumption of a control channel resource set configured by a second communication node is received; where the control channel resource set is formed by a first type of search space and/or a second type of search space; and the second channel characteristic assumption is used for configuration of control channel resources in the second type of search space.

In S202, a control channel resource sent by the second communication node is received according to the second channel characteristic assumption.

The control channel resource set refers to a downlink control channel resource set. In the present embodiment, a first channel characteristic assumption of the first type of search space can be determined via predefined criteria.

In some embodiments, the first type of search space includes a common search space and/or a beam recovery search space.

In some embodiments, the second type of search space includes a user-specific search space.

In some embodiments, the second channel characteristic assumption includes at least one of quasi co-location, spatial quasi co-location, or a transmission configuration indication state.

In some embodiments, in a case where the first type of search space and the second type of search space satisfy the first trigger condition, at least one of the following is included. The first type of search space is received or monitored. The second channel characteristic assumption is determined by the first channel characteristic assumption of the first type of search space. The second channel characteristic assumption is the same as the first channel characteristic assumption of the first type of search space. The second channel characteristic assumption is the same as a first channel characteristic assumption of a search space with a specific search space index in the first type of search space. The first channel characteristic assumption and the second channel characteristic assumption are the same as a first channel characteristic assumption of a search space with a specific search space index in the first type of search space. In a case where the second channel characteristic assumption and the first channel characteristic assumption are the same, the second type of search space is received or monitored.

In some embodiments, in the case where the first type of search space and the second type of search space satisfy the first trigger condition, the first trigger condition includes at least one of the following. The first type of search space and the second type of search space are in a same Orthogonal Frequency Division Multiplexing (OFDM) symbol. The first type of search space and the second type of search space are in a same time slot. The first type of search space and the second type of search space are in a same resource block. Monitoring windows associated with the first type of search space and the second type of search space overlap each other. And the first type of search space and the second type of search space that are valid at the same time. The specific search space index includes one of the following: a lowest index sequence number, a highest index sequence number, or a specific search space index sequence number.

In some embodiments, the first type of search space and the second type of search space are from a same control channel resource set. Inconsistency of channel characteristic hypotheses of the first type of search space and the second type of search space under different control resource sets, different carriers, different bandwidth parts (BWPs) can be ignored. Alternatively, non-simultaneous detection of the channel characteristic hypotheses of the first type of search space and the second type of search space under different control resource sets, different carriers, and different BWPs can be performed by the first communication node.

Figure 3:
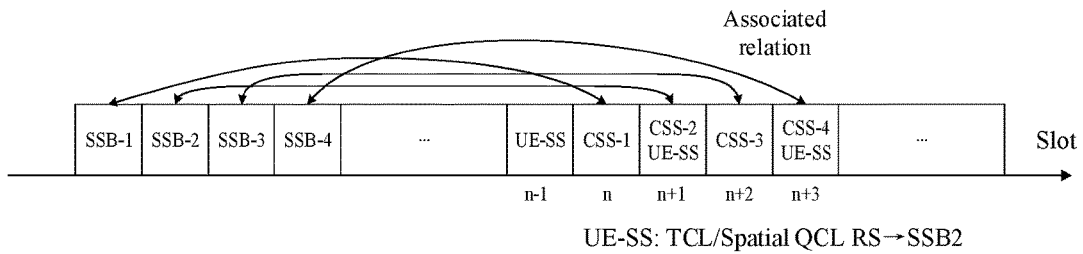
FIG. 3 is a schematic diagram illustrating an effective condition of PDCCH channel characteristic assumption related to respective embodiments of the present invention.

FIG. 3 is a schematic diagram illustrating an effective condition of PDCCH channel characteristic assumption related to the present application. UE-SS represents a UE specific search space, that is, the second type of search space in the embodiment of the present invention, and CSS represents a common search space, that is, the first type of search space in the embodiment of the present invention. The base station configures the channel characteristic assumption of the second type of search space UE-SS via the TCI, and the first type of search space, through default hypothesis or configuration, has a corresponding relationship with the previously sent SSB. Here, it is assumed that TCI configuration of the UE-SS is SSB2, and the UE-SS has a period of 2 slots. Therefore, in slot-{n+1} and slot-{n+3}, there exist a problem of simultaneous sending for the UE-SS and the CSS. The embodiment of the present invention requires that the CSS has a higher priority than UE-SS. During collision, the UE-SS needs to obey the channel characteristic assumption of the CSS. Therefore, in slot-{n+3}, the UE-SS needs to be received according to SSB-2 of the CSS-4. It should be noted that the first type of search space and the second type of search space may be from the same control resource set or from different control resource sets.

In some embodiments, in the case where the first type of search space and the second type of search space satisfy the first trigger condition, or the associated windows overlap or partially overlap, the following are further included. The first type of search space of one of a lowest index, a highest index or a specific index under a preset index is received or monitored; the second channel characteristic assumption is determined by the first type of channel characteristic assumption of one of the lowest index, the highest index or the specific index under the preset index; the second channel characteristic assumption is the same as the first channel characteristic assumption of one of the lowest index, the highest index or the specific index under the preset index; and the second channel characteristic assumption is the same as a channel characteristic assumption of a search space which has a lowest search space index and is in the first type of search space of one of the lowest index, the highest index or the specific index under the preset index.

In some embodiments, the preset index includes at least one of a carrier index, a BWP index, a control channel resource set index, or a control channel resource index. The preset index can also be referred to as a V-th type of index.

In some embodiments, in a case where the first type of search space and the second type of search space satisfy a second trigger condition, detecting or receiving the second type of search space is further included.

In some embodiments, in the case where the first type of search space and the second type of search space satisfy the second trigger condition, the second trigger condition includes at least one of the following. The second type of search space and the first type of search space are in different OFDM symbols. The second type of search space and the first type of search space are in different time slots. The second type of search space and the first type of search space are in different resource blocks. The second type of search space and the first type of search space are in different time instants. And the second type of search space and the first type of search space are in different carriers.

Optionally, when the second type of search space and the first type of search space collide in OFDM symbol, slot, RB (resource block, resource block), or carrier, the second type of search space may not be detected or received. Optionally, the second type of search space is monitored in the case where the first type of search space is not monitored or is not in its associated monitoring window. The first type of search space may be in a monitored state, or is in its associated monitoring window.

Optionally, in a case where the first type of search space is a beam recovery search space, the monitoring window starts from a time instant, when the first communication node transmits the PRACH, plus an offset time to a time instant when the first communication node receives the channel characteristic assumption reconfiguration for the downlink control channel.

Figure 4:
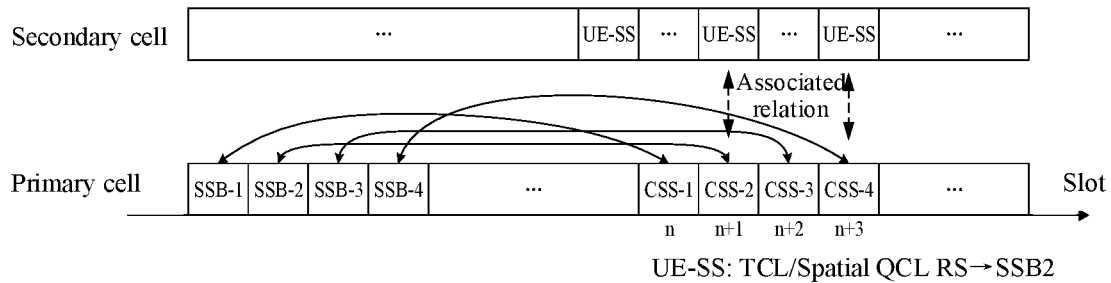
FIG. 4 is a schematic diagram illustrating an effective condition of PDCCH channel characteristic assumption related to respective embodiments of the present invention.

FIG. 4 is another schematic diagram illustrating an effective condition of PDCCH channel characteristic assumption related to the present application. In the case of considering a plurality of carriers, that is, in the case of a primary cell and a secondary cell, when the UE-SS and the CSS are sent at the same time, the channel characteristic assumption of a search space of the primary cell are given priority, then, from the first type of search space and the second type of search space in the primary cell, the channel characteristic assumption of the first type of search space is preferentially selected. Therefore, in this case, the channel characteristic assumption of the CSS in the primary cell needs to be obeyed to receive the UE-SS of the secondary cell.

The present embodiment provides a channel configuration method. In this method, the second channel characteristic assumption of the control channel resource set configured by the second communication node is received, where the control channel resource set is formed by the first type of search space and/or the second type of search space, and the second channel characteristic assumption is used for configuration of control channel resources in the second type of search space; and a control channel resource sent by the second communication node are received according to the second channel characteristic assumption. Therefore, the scheduling of channel resources is achieved by providing the second channel characteristic assumption, so that coordination among a plurality of control channels, data channels and reference signals is carried out, thereby effectively achieving simultaneous scheduling of the plurality of control channels, data channels, and reference signals, and significantly improving system performance.

Embodiment Two

Figure 5:
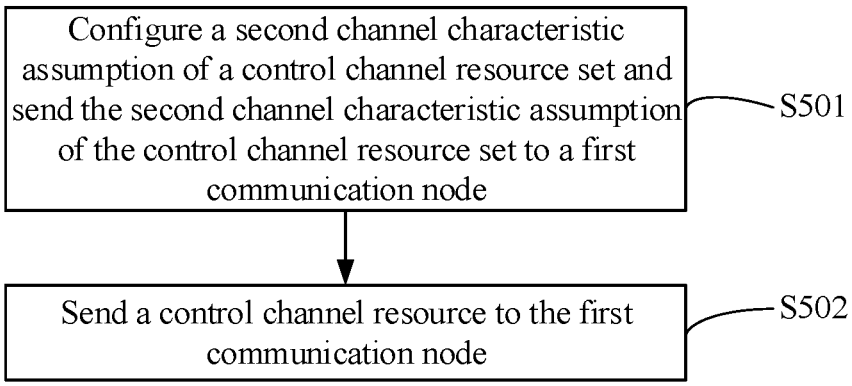
FIG. 5 is a flowchart illustrating a channel configuration method provided by Embodiment Two of the present invention.

Referring to FIG. 5, FIG. 5 is a flowchart illustrating a channel configuration method provided by Embodiment Two of the present invention. The method includes the following steps.

In S501, the second channel characteristic assumption of the control channel resource set is configured and sent to the first communication node; where the control channel resource set is formed by the first type of search space and/or the second type of search space; and the second channel characteristic assumption is used for configuration of control channel resources in the second type of search space.

In S502, the control channel resource is sent to the first communication node.

In some embodiments, the first type of search space includes the common search space and/or the beam recovery search space.

In some embodiments, the second type of search space includes the user-specific search space.

In some embodiments, the second channel characteristic assumption includes at least one of quasi co-location, spatial quasi co-location, and the transmission configuration indication state.

In some embodiments, in the case where the first type of search space and the second type of search space satisfy the first trigger condition, at least one of the following is included. The first type of search space is received or monitored. The second channel characteristic assumption is determined by the first channel characteristic assumption of the first type of search space. The second channel characteristic assumption is the same as the first channel characteristic assumption of the first type of search space. The second channel characteristic assumption is the same as the first channel characteristic assumption of a search space with a specific search space index in the first type of search space. The first channel characteristic assumption and the second channel characteristic assumption are the same as the first channel characteristic assumption of a search space with a specific search space index in the first type of search space. In a case where the second channel characteristic assumption and the first channel characteristic assumption are the same, the second type of search space is received or monitored.

In some embodiments, in the case where the first type of search space and the second type of search space satisfy the first trigger condition, the first trigger condition includes at least one of the following. The first type of search space and the second type of search space are in a same OFDM symbol. The first type of search space and the second type of search space are in a same time slot. The first type of search space and the second type of search space are in a same resource block. Monitoring windows associated with the first type of search space and the second type of search space overlap each other. And the first type of search space and the second type of search space that are valid at the same time.

In some embodiments, the first type of search space and the second type of search space are from a same control channel resource set.

In some embodiments, the following are further included. The first type of search space of one of the lowest index, the highest index or the specific index under the preset index is received or monitored; the second channel characteristic assumption is determined by the first type of channel characteristic assumption of one of the lowest index, the highest index or the specific index under the preset index; the second channel characteristic assumption is the same as the first channel characteristic assumption of one of the lowest index, the highest index or the specific index under the preset index; and the second channel characteristic assumption is the same as the channel characteristic assumption of the search space which has the lowest search space index and is in the first type of search space of one of the lowest index, the highest index or the specific index under the preset index.

In some embodiments, the preset index includes at least one of the carrier index, the BWP index, the control channel resource set index, and the control channel resource index.

In some embodiments, in the case where the first type of search space and the second type of search space satisfy the second trigger condition, detecting or receiving the second type of search space is further included.

In some embodiments, in the case where the first type of search space and the second type of search space satisfy the second trigger condition, the second trigger condition includes at least one of the following. The second type of search space and the first type of search space are in different OFDM symbols. The second type of search space and the first type of search space are in different time slots. The second type of search space and the first type of search space are in different resource blocks. The second type of search space and the first type of search space are in different time instants. And the second type of search space and the first type of search space are in different carriers.

This embodiment provides a channel configuration method, including configuring the second channel characteristic assumption of the control channel resource set and sending the second channel characteristic assumption of the control channel resource set to the first communication node, and then sending the control channel resource to the first communication node. Therefore, the scheduling of channel resources is achieved by providing the second channel characteristic assumption, so that coordination among a plurality of control channels, data channels and reference signals is carried out, thereby effectively achieving simultaneous scheduling of the plurality of control channels, data channels, and reference signals, and significantly improving system performance.

Embodiment Three

Figure 6:
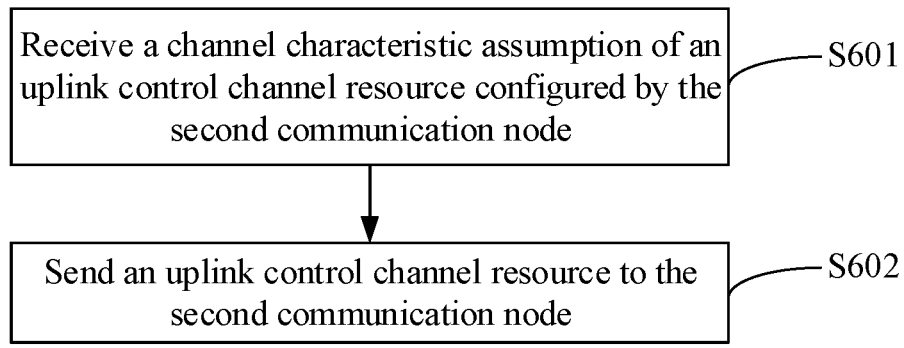
FIG. 6 is a flowchart illustrating a channel configuration method provided by Embodiment Three of the present invention.

FIG. 6 is a flowchart illustrating a channel configuration method provided by Embodiment Three of the present invention. The method includes the following steps.

In S601, the channel characteristic assumption of the uplink control channel resource configured by the second communication node is received; and In S602, the uplink control channel associated with the uplink control channel resource is sent to the second communication node according to the channel characteristic assumption of the uplink control channel resource.

In some embodiment, in a case where N different uplink control channel resources are simultaneously sent, the N uplink control channel resources are transmitted through at least one of the following channel characteristic assumption of the uplink control channel resources: a channel characteristic assumption of the uplink control channel resource of the lowest, highest or specific uplink control channel resource index; channel characteristic assumption of the uplink control channel resources under a carrier or primary carrier of the lowest or highest carrier index; channel characteristic assumption of the uplink control channel resource under the BWP or an activated BWP under the lowest or highest BWP index; channel characteristic assumption of uplink control channel resources of the lowest or highest or specific uplink control channel resource index under the carrier or primary carrier of the lowest or highest carrier index; channel characteristic assumption of uplink control channel resources of the lowest or highest or specific uplink control channel resource index under the BWP or the activated BWP under the lowest or highest BWP index; channel characteristic assumption of the uplink control resources under the carrier or primary carrier of the lowest or highest carrier index and/or the BWP or the activated BWP under the lowest or highest BWP index; and channel characteristic assumption of the uplink control resources of the lowest or highest or specific uplink control resource index under the carrier or the primary carrier of the lowest or highest carrier index and/or the BWP or activated BWP under the lowest or highest BWP index. The primary carrier indicates the primary cell, or a primary cell under the primary Physical Uplink Control Channel (PUCCH) group.

In some embodiment, the simultaneously sending the N different uplink control channel resources includes the simultaneously sending the N different uplink control channel resources in at least one of the following: a same Orthogonal Frequency Division Multiplexing (OFDM) symbol, a same time slot, a same resource block, overlapped monitoring windows associated with the N different uplink control channel resources, or all being valid at the same time.

In some embodiments, the channel characteristic assumption includes spatial relation information or spatial relation.

In some embodiments, a priority of at least one of an uplink reference signal, an uplink data channel or an uplink control channel in which the uplink reference signal, the uplink data channel and the uplink control channel are scheduled by a common search space is higher than priorities of an uplink reference signal, an uplink data channel and an uplink control channel that are scheduled by a user-specific search space.

In some embodiments, channel characteristic hypotheses of the uplink reference signal, uplink data channel and uplink control channel that have the lower priorities are determined according to the at least one of the uplink reference signal, the uplink data channel or the uplink control channel that has the higher priority; or the reference signal or channel that has the lower priority is not sent.

The present embodiment provides a channel configuration method. In this method, a channel characteristic assumption of the uplink control channel resource of the control channel resource set configured by the second communication node is received, and the uplink control channel resource is sent to the second communication node according to the channel characteristic assumption of the uplink control channel resource. Therefore, the scheduling of channel resources is achieved by setting the channel characteristic assumption of the uplink control channel resource, so that coordination among the plurality of control channels, data channels and reference signals is carried out, thereby effectively achieving simultaneous scheduling of the plurality of control channels, data channels, and reference signals, and significantly improving system performance.

Embodiment Four

Figure 7:
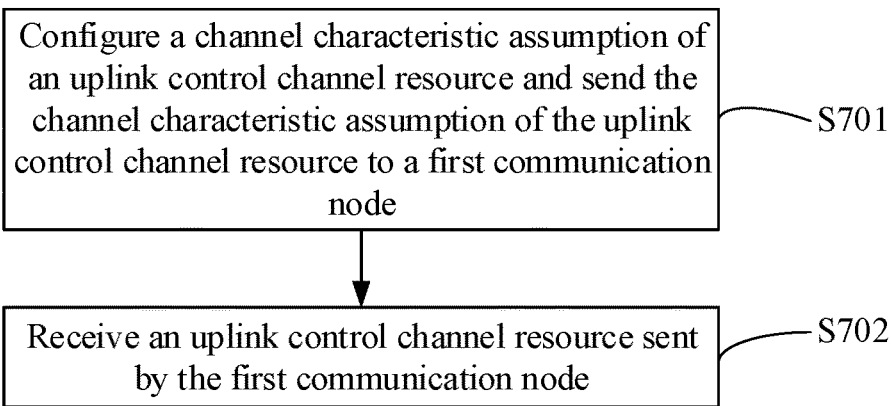
FIG. 7 is a flowchart illustrating a channel configuration method provided by Embodiment Four of the present invention.

Referring to FIG. 7, FIG. 7 is a flowchart illustrating a channel configuration method provided by Embodiment Four of the present invention. The method includes the following steps.

In S701, a channel characteristic assumption of uplink control channel resources is configured and sent to the first communication node; and In S702, an uplink control channel associated with the uplink control channel resources sent by the first communication node according to the channel characteristic assumption of the uplink control channel resources is received.

In some embodiment, in the case where different N uplink control channel resources are simultaneously sent, the N uplink control channel resources are sent through at least one of the following channel characteristic assumption of the uplink control channel resources. Channel characteristic assumption of the uplink control channel resources of the lowest, highest or specific uplink control channel resource index; channel characteristic assumption of the uplink control channel resources under a carrier or primary carrier of the lowest or highest carrier index; channel characteristic assumption of the uplink control channel resource under the BWP or an activated BWP under the lowest or highest BWP index; channel characteristic assumption of uplink control channel resources of the lowest or highest or specific uplink control channel resource index under the carrier or primary carrier of the lowest or highest carrier index; and channel characteristic assumption of uplink control channel resources of the lowest or highest or specific uplink control channel resource index under the BWP or the activated BWP under the lowest or highest BWP index.

In some embodiment, the simultaneously sending the N different uplink control channel resources includes the simultaneously sending the N different uplink control channel resources in at least one of the following: a same Orthogonal Frequency Division Multiplexing (OFDM) symbol, a same time slot, a same resource block, overlapped monitoring windows associated with the N different uplink control channel resources, or all being valid at the same time.

In some embodiments, the channel characteristic assumption includes the spatial relation information or the spatial relation.

In some embodiments, a priority of at least one of an uplink reference signal, an uplink data channel or an uplink control channel in which the uplink reference signal, the uplink data channel and the uplink control channel are scheduled by a common search space is higher than priorities of an uplink reference signal, an uplink data channel and an uplink control channel that are scheduled by a user-specific search space.

In some embodiments, channel characteristic hypotheses of the uplink reference signal, uplink data channel and uplink control channel that have the lower priorities are determined according to the at least one of the uplink reference signal, the uplink data channel or the uplink control channel that has the higher priority.

The present embodiment provides a channel configuration method, including: configuring the channel characteristic assumption of an uplink control channel resource and sending the channel characteristic assumption of the uplink control channel resource to the first communication node; and receiving the uplink control channel resources sent by the first communication node according to the channel characteristic assumption of the uplink control channel resources. Therefore, the scheduling of channel resources is achieved by providing the channel characteristic assumption of the uplink control channel resource, so that coordination among the plurality of control channels, data channels and reference signals is carried out, thereby effectively achieving simultaneous scheduling of the plurality of control channels, data channels, and reference signals, and significantly improving the system performance.

Embodiment Five

Figure 8:
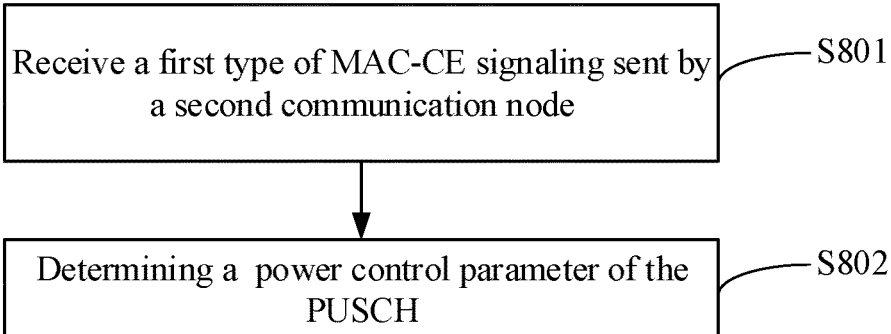
FIG. 8 is a flowchart illustrating a channel power control method provided by Embodiment Five of the present invention.

Referring to FIG. 8, FIG. 8 is a flowchart illustrating a channel power control method provided by Embodiment Five of the present invention. The method includes the following steps.

In S801, a first type of Media Access Control-Control Element (MAC-CE) signaling sent by the second communication node is received; and In S802, the power control parameter of the PUSCH is determined according to the first type of MAC-CE signaling.

In some embodiment, the first type of MAC-CE signaling is used to activate or deactivate a semi-persistent channel sounding reference signal (SRS), or to configure a spatial relation of the associated SRS; and the SRS is used in a non-codebook mode or a codebook mode.

In some embodiment, the determining the power control parameter of the PUSCH includes at least one of the following: determining an open-loop power control parameter of the PUSCH according to the first type of MAC-CE signaling; determining a path loss (PL) reference signal of the PUSCH according to the first type of MAC-CE signaling; determining a closed-loop power control index of the PUSCH according to the first type of MAC-CE signaling; and resetting a closed-loop power control value of the PUSCH.

In some embodiments, the open-loop power control parameters include alpha and target power p0.

In some embodiments, the first type of MAC-CE signaling includes at least one of the following: the first type of MAC-CE signaling carrying an element index in the open-loop power control parameter set associated with the channel sounding reference signal resource indicator (SRI) code value in the downlink control information (DCI), or carrying an open-loop power control parameter value associated with a SRI field in the DCI; the first type of MAC-CE signaling carrying an element index in a set of PL reference signals associated with the SRI code value in the DCI, or carrying a PL reference signal index associated with the SRI field in the DCI; and the first type of MAC-CE signaling carrying the closed-loop power control index associated with the SRI code value in the DCI.

In some embodiment, the following are further included: determining the open-loop power control parameter of the PUSCH by the element index, associated with the SRI code value in the DCI configured by Radio Resource Control (RRC), in the open-loop power control parameter set; determining the PL reference signal of the PUSCH, by the downlink reference signal associated with a spatial parameter of a semi-persistent SRS associated with the SRI in the DCI; determining the open-loop power control parameter of the PUSCH by the closed-loop power control index associated with the SRI code value in the DCI configured by RRC.

In some embodiment, the following are further included: configuring the open-loop power control parameter set, by RRC signaling; and configuring the reference signal set of PL, by RRC signaling.

Embodiment Six

Figure 9:
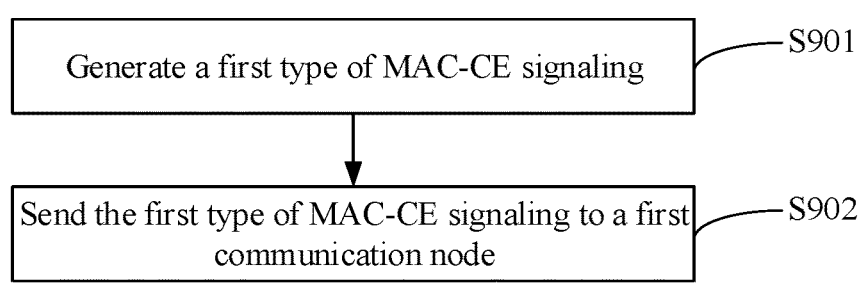
FIG. 9 is a flowchart illustrating a channel power control method provided by Embodiment Six of the present invention.

Referring to FIG. 9, FIG. 9 is a flowchart illustrating a channel power control method provided by Embodiment Six of the present invention. The method includes the following steps.

In S901, a first type of MAC-CE signaling is generated; where the first type of MAC-CE signaling is used to determine the power control parameters of the PUSCH.

In S902, the first type of MAC-CE signaling is sent to the first communication node.

In some embodiment, the first type of MAC-CE signaling is used to activate or deactivate a semi-persistent channel sounding reference signal (SRS), or to configure a spatial relation of the associated SRS; and the SRS is used in a non-codebook mode or a codebook mode.

In some embodiment, the determining the power control parameter of the PUSCH includes at least one of the following: determining the open-loop power control parameter of the PUSCH according to the first type of MAC-CE signaling; determining a path loss (PL) reference signal of the PUSCH according to the first type of MAC-CE signaling; determining the closed-loop power control index of the PUSCH according to the first type of MAC-CE signaling; and resetting the closed-loop power control value of the PUSCH.

In some embodiments, the open-loop power control parameters include alpha and target power p0.

In some embodiments, the first type of MAC-CE signaling includes at least one of the following: the first type of MAC-CE signaling carrying the element index in the open-loop power control parameter set associated with the SRI code value in the DCI, or carrying the open-loop power control parameter value associated with the SRI field in the DCI; the first type of MAC-CE signaling carrying the element index in the set of PL reference signals associated with the SRI code value in the DCI, or carrying the PL reference signal index associated with the SRI field in the DCI; and the first type of MAC-CE signaling carrying the closed-loop power control index associated with the SRI code value in the DCI.

In some embodiment, the following are further included: determining the open-loop power control parameter of the PUSCH by the element index, associated with the SRI code value in the DCI configured by RRC, in the open-loop power control parameter set; determining the PL reference signal of the PUSCH, by the downlink reference signal associated with a spatial parameter of a semi-persistent SRS associated with the SRI in the DCI; determining, the open-loop power control parameter of the PUSCH, by the closed-loop power control index associated with the SRI code value in the DCI configured by RRC.

Embodiment Seven

Embodiment Seven of the present invention provides a channel configuration method, which is applicable to the case where the first type of search space and the second type of search space satisfy the first trigger condition, and the details are described as follows.

In a case where the first type of search space and the second type of search space are in the same OFDM symbol, or in the same time slot, or in the same RB, or the monitoring windows associated with the first type of search space and the second type of search space overlap each other, or the first type of search space and the second type of search space are valid at the same time, that is, the first type of search space and the second type of search space satisfy the first trigger condition, if a channel characteristic assumption of the first type of search space and a channel characteristic assumption of the second type of search space are different, it means that the base station needs to use different sending beams for sending, and simultaneously, the UE end needs to use different receiving beams for receiving. However, since the base station end can only support simultaneous sending of one beam, or the UE can only support simultaneous receiving of one beam, there is a conflict between the monitoring requirement and the capability. Therefore, it is necessary to modify the channel characteristic hypotheses of different search spaces. Optionally, at least one or a combination of the following is performed. Alternatively, #1 the first type of search space is received or monitored. Alternatively, #2 the second channel characteristic assumption of the second type of search space is determined by the first channel characteristic assumption of the first type of search space. Alternatively, #3 the second channel characteristic assumption of the second type of search space is the same as the first channel characteristic assumption of the first type of search space. Alternatively, #4 the second channel characteristic assumption of the second type of search space is the same as the first channel characteristic assumption of the search space with the lowest, the highest or the specific search space index in the first type of search space. Alternatively, #5 the channel characteristic hypotheses of the first type of search space and the second type of search space, that is, the first channel characteristic assumption and the second channel characteristic assumption, are the same as the first channel characteristic assumption of the search space with the lowest, the highest and specific search space index in the first type of search space. Alternatively, #6 in a case where the second channel characteristic assumption of the second type of search space and the first channel characteristic assumption of the first type of search space are the same, the second type of search space is received or monitored.

The above solution is applicable to the case where the first type of search space and the second type of search space are from a same control channel resource set. Inconsistency of channel characteristic hypotheses of the first type of search space and the second type of search space under different control resource sets, different carriers, different BWPs can be ignored. Alternatively, non-simultaneous detection of the channel characteristic hypotheses between the first type of search space and the second type of search space under different control resource sets, different carriers, and different BWPs can be performed by the first communication node.

Embodiment Eight

Embodiment Eight of the present invention provides a channel configuration method, and details are described as follows.

In addition to a case of a single carrier or a single bandwidth part (BWP), it is further extended to a case of carrier aggregation or multi-BWP operations. The first type of search space and the second type of search space may come from different BWPs or different carriers. In the case where the first type of search space and the second type of search space are in the same OFDM symbol, or in the same slot, or in the same RB, or the monitoring windows associated with the first type of search space and the second type of search space overlap each other, or valid at the same time, that is, in the case where the first type of search space and the second type of search space satisfy the first trigger condition, the following content may be included. #1 The first type of search space is received or monitored. Alternatively, #2 the first type of search space with one of the lowest, the highest or the specific index under the preset index is received or monitored. Alternatively, #3 the second channel characteristic assumption of the second type of search space is determined by the first channel characteristic assumption of the first type of search space with one of the lowest index, the highest index or the specific index under the preset index. Alternatively, #4 the second channel characteristic assumption of the second type of search space should be the same as the first channel characteristic assumption of the first type of search space of one of the lowest, highest, or specific index under the preset index. Alternatively, #5 the second channel characteristic assumption of the second type of search space should be the same as the first channel characteristic assumption of the search space with the lowest search space index in the first type of search space with the lowest, highest or specific index under the preset index. Alternatively, #6 the channel characteristic assumption of the first type search space and the second type search space may also not affect each other.

The preset index is formed of one or a combination of the carrier index, the BWP index, the control channel resource set index, or the control channel resource index.

Optionally, the simultaneous validity referred to in this embodiment refers to taking effect at the same time, including the case where time domains under different carrier intervals and different numerologies partially overlap.

In addition, in this embodiment, the UE end can also be specified to obey a code of conduct, that is, when the second type of search space and the first type of search space collide in OFDM symbol, slot, RB, or carrier, the second type of search space is not detected or received; or, when the first type of search space is not monitored or is not in its associated monitoring window, the second type of search space is monitored. However, in the case where the second type of search space and the first type of search space are in different OFDM symbols, or in different slots, or in different RBs, or at different time instants, or in different carriers, that is, in the case where the first type of search space and the second type of search space satisfy the second trigger condition, the second type of search space is detected or received.

Optionally, the first type of search space is in a monitored state, or is in its associated monitoring window.

Optionally, in the case where the first type of search space is a beam recovery search space, the monitoring window starts from a time instant, when the first communication node transmits the PRACH, plus an offset time to a time instant when the first communication node receives the channel characteristic assumption reconfiguration for the downlink control channel.

Embodiment Nine

Embodiment Nine of the present invention provides a channel configuration method applied to channel configuration under a PUCCH condition, and details are described as follows.

With regard to an uplink control channel, a method of configuring a channel characteristic assumption for a UE end by a base station end specifically includes: receiving a channel characteristic assumption of an uplink control channel resource configured by a second communication node; and sending the uplink control channel resource to the second communication node according to the channel characteristic assumption of the uplink control channel resources.

Optionally, in the case where different N uplink control channel resources are sent at the same time, the N uplink control channel resources obey at least one of following setting manners of the channel characteristic assumption: #1 channel characteristic assumption of the uplink control channel resources of the lowest, highest or specific uplink control channel resource index; #2 channel characteristic assumption of the uplink control channel resources under a carrier or primary carrier of the lowest or highest carrier index; #3 channel characteristic assumption of the uplink control channel resource under the BWP or an activated BWP under the lowest or highest BWP index; #4 channel characteristic assumption of uplink control channel resources of the lowest or highest or specific uplink control channel resource index under the carrier or primary carrier of the lowest or highest carrier index; #5 channel characteristic assumption of uplink control channel resources of the lowest or highest or specific uplink control channel resource index under the BWP or the activated BWP under the lowest or highest BWP index; #6 channel characteristic assumption of the uplink control channel resources under the carrier or primary carrier of the lowest or highest carrier index and/or the BWP or the activated BWP under the lowest or highest BWP index; and #7 channel characteristic assumption of the uplink control channel resources of the lowest or highest or specific uplink control channel resource index under the carrier or the primary carrier of the lowest or highest carrier index and/or the BWP or activated BWP under the lowest or highest BWP index.

The specific index refers to an index of a predefined specific index number, such as a case where the uplink control channel resource index is 0 or 127.

The primary carrier is also referred to as a primary cell, or a primary cell under the primary PUCCH group.

Optionally, the simultaneously sending the N different uplink control channel resources specifically includes the simultaneously sending the N different uplink control channel resources in at least one of the following: a same Orthogonal Frequency Division Multiplexing (OFDM) symbol, a same time slot, a same resource block, overlapped monitoring windows associated with the N different uplink control channel resources, or all being valid at the same time.

The channel characteristic assumption may include the spatial relation information or the spatial relation.

Optionally, a priority of at least one of an uplink reference signal, an uplink data channel or an uplink control channel in which the uplink reference signal, the uplink data channel and the uplink control channel are scheduled by a common search space is higher than priorities of an uplink reference signal, an uplink data channel and an uplink control channel that are scheduled by a user-specific search space.

Optionally, during the simultaneously sending in at least one of the same RB, the same OFDM symbol, the same time slot, the same BWP or the same carrier, a channel characteristic assumption of the reference signal or channel which has the lower priority can be determined according to the reference signal or channel which has the higher priority, or the reference signal or channel has the lower priority is not sent.

Figure 10:
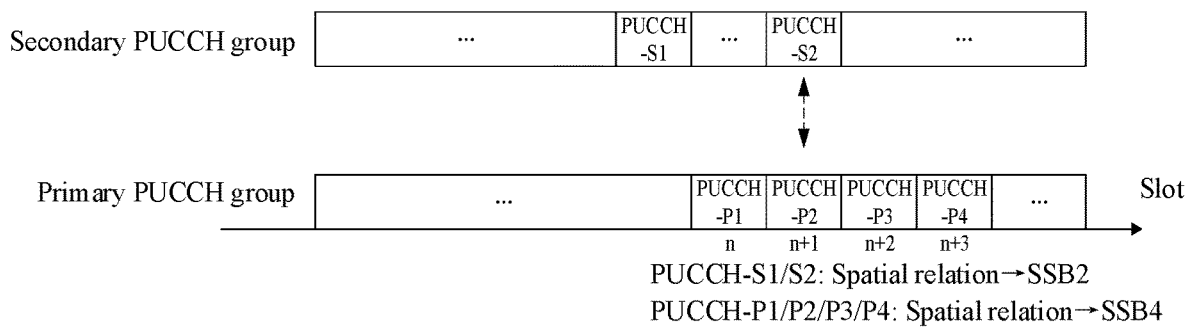
FIG. 10 is a schematic diagram illustrating an effective rule of PDCCH channel characteristic assumption related to respective embodiments of the present invention.

FIG. 10 is a schematic diagram illustrating an effective rule of PDCCH channel characteristic assumption related to the present application. In a case where the UE is configured with the Primary PUCCH group and a Secondary PUCCH group, at a time instant n+1, a PUCCH resource PUCCH-P2 under the primary PUCCH group collides with a PUCCH-S2 under the Secondary PUCCH group, and spatial relation information of the Primary PUCCH group is preferentially obeyed. In this way, a relatively flexible PUCCH resource scheduling can be achieved by using the specified priority and obedience method while taking into account capabilities of the UE and the base station.

Embodiment Ten

Embodiment Ten of the present invention provides a channel power control method.

A method for determining power control of an uplink shared channel (PUSCH), applied to an UE end, includes: receiving a first type of MAC-CE signaling sent from a base station end to the UE end; and determining a power control parameter of the PUSCH according to the first type of MAC-CE signaling.

The determining method includes at least one of the following: #1 determining the open-loop power control parameters of the PUSCH by the first type of MAC-CE signaling; #2 determining the PL reference signal of the PUSCH by the first type of MAC-CE signaling; #3 determining the closed-loop power control index of PUSCH by the first type of MAC-CE signaling; and #4 resetting the closed-loop power control value of PUSCH.

The open-loop power control parameters can be formed of the alpha and the target power p0.

However, the semi-persistent SRS associated with PUSCH transmission can be activated through the MAC-CE signaling and carry the spatial relation information of the SRS. Further, the first type of MAC-CE signaling is used to activate or deactivate the semi-persistent SRS, or to configure the spatial relation of the associated SRS, that is, the first MAC-CE signaling is the same signaling as the activated semi-persistent SRS.

Further, the SRS is used in the non-codebook mode or the codebook mode. Specifically, the non-codebook mode and the codebook mode are transmission modes for the PUSCH.

Further, if a MAC-CE activation signaling of the SRS is received and the SRS is used in the non-codebook mode or codebook mode, the closed-loop power control value associated with the PUSCH needs to be reset (in a case where the PUSCH uses the closed-loop power control in a cumulative mode).

Specifically, the first type of MAC-CE signaling indicates the association between the element index in the open-loop power control parameter set and the SRI code value in the DCI, or the first type of MAC-CE signaling carries the open-loop power control parameter value associated with the SRI field in the DCI. Or, the first type of MAC-CE signaling indicates the association between the element index in the set of PL reference signals and the SRI code value in the DCI, or the first type of MAC-CE signaling carries the PL reference signal index associated with the SRI field in the DCI. Or, the first type of MAC-CE signaling carries the closed-loop power control index associated with the SRI code value in the DCI.

In addition, the following methods can also be used to control the uplink transmission power of the associated PUSCH: #1 the first type of MAC-CE signaling further includes: determining the open-loop power control parameter of the PUSCH by the element index in the open-loop power control parameter set associated with the SRI code value in the DCI configured by RRC; or, #2 determining the PL reference signal of the PUSCH by the downlink reference signal associated with the spatial parameter of the semi-persistent SRS associated with the SRI in the DCI; or, #3 determining the open-loop power control parameter of the PUSCH by the closed-loop power control index associated with the SRI code value in the DCI configured by RRC.

FIG. 11 is a schematic diagram illustrating a signaling format of a power control parameter configured by the MAC-CE related to the present application. In an explicit form, the MAC-CE configures a power control parameter in a SRI value in the corresponding DCI, that is, values of target power P0 and alpha, a reference signal index, and a closed-loop power control index. If there is only one SRS, SRI is not explicitly carried by a DCI, and the corresponding above-mentioned parameters also need to be configured for SRI=0 indicated by default. FIG. 12 is another schematic diagram illustrating a signaling format of the MAC-CE configuring power control parameters related to the present application. In the RRC signaling, a parameter resource set for uplink power control has been configured. In this case, the MAC-CE signaling indicates the corresponding element in the parameter resource set to implement the configuration of power control parameters. Specifically, a corresponding P0 and alpha set index (that is, an open-loop power control parameter set, the RRC configures a set carrying a plurality of open-loop power control parameter sets), a PL reference signal resource index, and the closed-loop power control index are configured for each SRI.

In summary, according to the configured or predetermined channel configuration methods or channel power control methods, coordination among the plurality of control channels, data channels and reference signals is carried out to effectively achieve simultaneous scheduling of the plurality of control channels, data channels and reference signals under the premise of ensuring support capabilities of the base station and the user end, thereby significantly improving the system performance.

Embodiment Eleven

Figure 13:
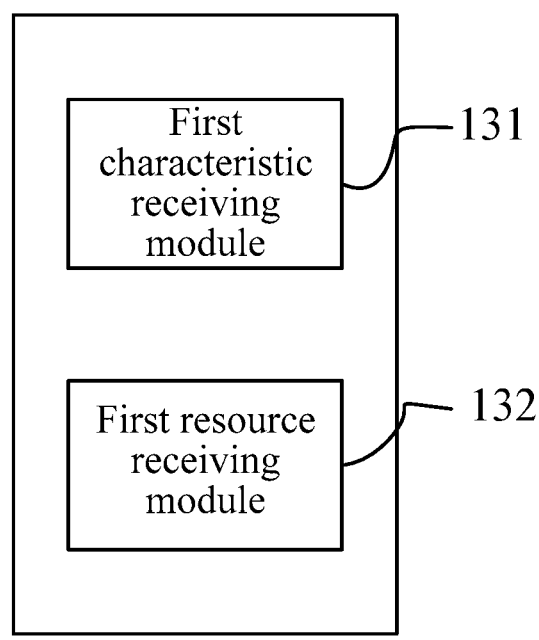
FIG. 13 is a schematic diagram illustrating composition of a channel configuration device provided by Embodiment Eleven of the present invention.

Referring to FIG. 13, FIG. 13 is a schematic diagram illustrating composition of a channel configuration device provided by the present embodiment. The device includes: a first characteristic receiving module 131 configured to receive the second channel characteristic assumption of the control channel resource set configured by the second communication node; where the control channel resource set is formed by the first type of search space and/or the second type of search space; and the second channel characteristic assumption is used for configuration of control channel resources in the second type of search space; and a first resource receiving module 132 configured to receive the control channel resource sent by the second communication node according to the second channel characteristic assumption.

In some embodiments, the first type of search space includes the common search space and/or the beam recovery search space.

In some embodiments, the second type of search space includes the user-specific search space.

In some embodiments, the second channel characteristic assumption includes at least one of quasi co-location, spatial quasi co-location, and the transmission configuration indication state.

In some embodiments, in the case where the first type of search space and the second type of search space satisfy the first trigger condition, at least one of the following is included. The first type of search space is received or monitored. The second channel characteristic assumption is determined by the first channel characteristic assumption of the first type of search space. The second channel characteristic assumption is the same as the first channel characteristic assumption of the first type of search space. The second channel characteristic assumption is the same as the first channel characteristic assumption of a search space with the specific search space index in the first type of search space. The first channel characteristic assumption and the second channel characteristic assumption are the same as the first channel characteristic assumption of a search space with the specific search space index in the first type of search space. In a case where the second channel characteristic assumption and the first channel characteristic assumption are the same, the second type of search space is received or monitored.

In some embodiments, in the case where the first type of search space and the second type of search space satisfy the first trigger condition, the first trigger condition includes at least one of the following. The first type of search space and the second type of search space are in the same OFDM symbol. The first type of search space and the second type of search space are in the same time slot. The first type of search space and the second type of search space are in the same resource block. Monitoring windows associated with the first type of search space and the second type of search space overlap each other. And the first type of search space and the second type of search space that are valid at the same time.

In some embodiments, the first type of search space and the second type of search space are from a same control channel resource set.

In some embodiments, the following are further included. The first type of search space of one of the lowest index, the highest index or the specific index under the preset index is received or monitored; the second channel characteristic assumption is determined by the first type of channel characteristic assumption of one of the lowest index, the highest index or the specific index under the preset index; the second channel characteristic assumption is the same as the first channel characteristic assumption of one of the lowest index, the highest index or the specific index under the preset index; and the second channel characteristic assumption is the same as the channel characteristic assumption of the search space which has the lowest search space index and is in the first type of search space of the lowest index, the highest index or the specific index under the preset index.

In some embodiments, the preset index includes at least one of the carrier index, the BWP index, the control channel resource set index, or the control channel resource index.

In some embodiments, in the case where the first type of search space and the second type of search space satisfy the second trigger condition, detecting or receiving the second type of search space is further included.

In some embodiments, in the case where the first type of search space and the second type of search space satisfy the second trigger condition, the second trigger condition includes one of the following content. The second type of search space and the first type of search space are in different OFDM symbols. The second type of search space and the first type of search space are in different time slots. The second type of search space and the first type of search space are in different resource blocks. The second type of search space and the first type of search space are in different time instants. And the second type of search space and the first type of search space are in different carriers.

Embodiment Twelve

Figure 14:
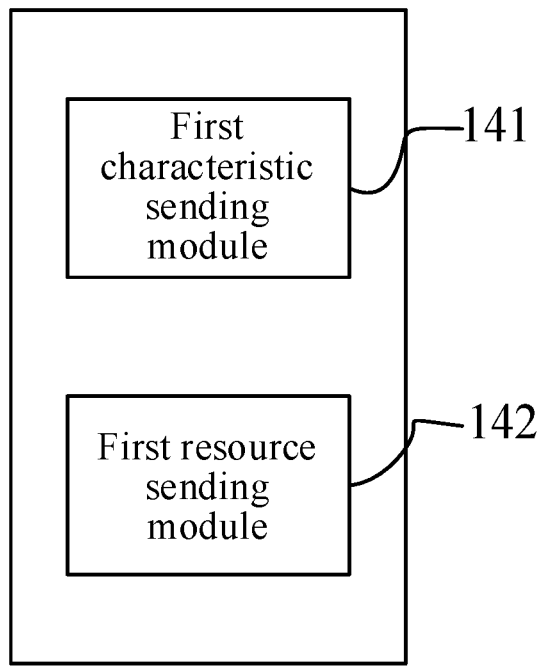
FIG. 14 is a schematic diagram illustrating composition of a channel configuration device provided by Embodiment Twelve of the present invention.

Referring to FIG. 14, FIG. 14 is a schematic diagram illustrating composition of a channel configuration device provided by the present embodiment. The device includes: a first characteristic sending module 141 configured to configure a second channel characteristic assumption of a control channel resource set and send the second channel characteristic assumption of the control channel resource set; where the control channel resource set is formed by the first type of search space and/or the second type of search space; and the second channel characteristic assumption is used for configuration of control channel resources in the second type of search space; and a first resource sending module 142 configured to transmit the control channel resource to the first communication node.

In some embodiments, the first type of search space includes the common search space and/or the beam recovery search space.

In some embodiments, the second type of search space includes the user-specific search space.

In some embodiments, the second channel characteristic assumption includes at least one of quasi co-location, spatial quasi co-location, and the transmission configuration indication state.

In some embodiments, in the case where the first type of search space and the second type of search space satisfy the first trigger condition, at least one of the following is included. The first type of search space is received or monitored. The second channel characteristic assumption is determined by the first channel characteristic assumption of the first type of search space. The second channel characteristic assumption is the same as the first channel characteristic assumption of the first type of search space. The second channel characteristic assumption is the same as the first channel characteristic assumption of a search space with the specific search space index in the first type of search space. The first channel characteristic assumption and the second channel characteristic assumption are the same as the first channel characteristic assumption of a search space with the specific search space index in the first type of search space. In a case where the second channel characteristic assumption and the first channel characteristic assumption are the same, the second type of search space is received or monitored.

In some embodiments, in the case where the first type of search space and the second type of search space satisfy the first trigger condition, the first trigger condition includes at least one of the following. The first type of search space and the second type of search space are in the same OFDM symbol. The first type of search space and the second type of search space are in the same time slot. The first type of search space and the second type of search space are in the same resource block. Monitoring windows associated with the first type of search space and the second type of search space overlap each other. And the first type of search space and the second type of search space that are valid at the same time.

In some embodiments, the first type of search space and the second type of search space are from a same control channel resource set.

In some embodiments, the following are further included. The first type of search space of one of the lowest index, the highest index or the specific index under the preset index is received or monitored; the second channel characteristic assumption is determined by the first type of channel characteristic assumption of one of the lowest index, the highest index or the specific index under the preset index; the second channel characteristic assumption is the same as the first channel characteristic assumption of one of the lowest index, the highest index or the specific index under the preset index; and the second channel characteristic assumption is the same as the channel characteristic assumption of the search space which has the lowest search space index and is in the first type of search space of the lowest index, the highest index or the specific index under the preset index.

In some embodiments, the preset index includes at least one of the carrier index, the BWP index, the control channel resource set index, and the control channel resource index.

In some embodiments, in the case where the first type of search space and the second type of search space satisfy the second trigger condition, detecting or receiving the second type of search space is further included.

In some embodiments, in the case where the first type of search space and the second type of search space satisfy the second trigger condition, the second trigger condition includes at least one of the following. The second type of search space and the first type of search space are in different OFDM symbols. The second type of search space and the first type of search space are in different time slots. The second type of search space and the first type of search space are in different resource blocks. The second type of search space and the first type of search space are in different time instants. And the second type of search space and the first type of search space are in different carriers.

Embodiment Thirteen

Figure 15:
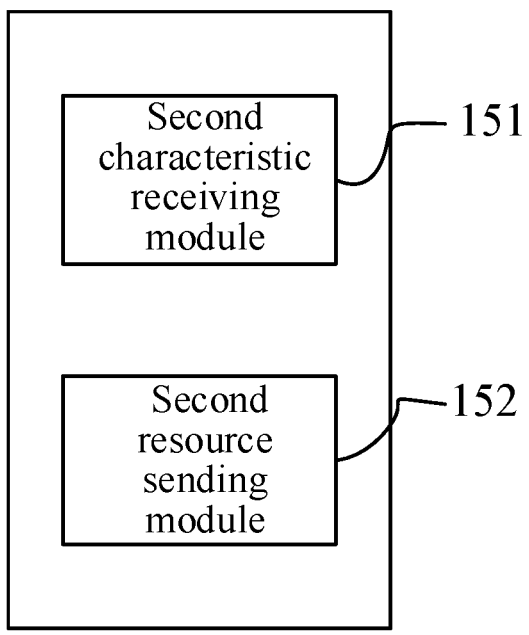
FIG. 15 is a schematic diagram illustrating composition of a channel configuration device provided by Embodiment Thirteen of the present invention.

Referring to FIG. 15, FIG. 15 is a schematic diagram illustrating composition of a channel configuration device provided by the present embodiment. The device includes: a second characteristic receiving module 151 configured to receive the channel characteristic assumption of uplink control channel resources configured by the second communication node; and a second resource sending module 152 configured to transmit the uplink control channel associated with the uplink control channel resources to the second communication node according to the channel characteristic assumption of the uplink control channel resources.

In some embodiments, the first type of search space includes the common search space and/or the beam recovery search space.

In some embodiments, the second type of search space includes the user-specific search space.

In some embodiments, the second channel characteristic assumption includes at least one of quasi co-location, spatial quasi co-location, and the transmission configuration indication state.

In some embodiments, in the case where the first type of search space and the second type of search space satisfy the first trigger condition, at least one of the following is included. The first type of search space is received or monitored. The second channel characteristic assumption is determined by the first channel characteristic assumption of the first type of search space. The second channel characteristic assumption is the same as the first channel characteristic assumption of the first type of search space. The second channel characteristic assumption is the same as the first channel characteristic assumption of a search space with the specific search space index in the first type of search space. The first channel characteristic assumption and the second channel characteristic assumption are the same as the first channel characteristic assumption of a search space with the specific search space index in the first type of search space. In a case where the second channel characteristic assumption and the first channel characteristic assumption are the same, the second type of search space is received or monitored.

In some embodiments, in the case where the first type of search space and the second type of search space satisfy the first trigger condition, the first trigger condition includes at least one of the following content. The first type of search space and the second type of search space are in the same OFDM symbol. The first type of search space and the second type of search space are in the same time slot. The first type of search space and the second type of search space are in the same resource block. Monitoring windows associated with the first type of search space and the second type of search space overlap each other. And the first type of search space and the second type of search space that are valid at the same time.

In some embodiments, the first type of search space and the second type of search space are from a same control channel resource set.

In some embodiments, the following are further included. The first type of search space of one of the lowest index, the highest index or the specific index under the preset index is received or monitored; the second channel characteristic assumption is determined by the first type of channel characteristic assumption of one of the lowest index, the highest index or the specific index under the preset index; the second channel characteristic assumption is the same as the first channel characteristic assumption of one of the lowest index, the highest index or the specific index under the preset index; and the second channel characteristic assumption is the same as the channel characteristic assumption of the search space which has the lowest search space index and is in the first type of search space of the lowest index, the highest index or the specific index under the preset index.

In some embodiments, the preset index includes at least one of the carrier index, the BWP index, the control channel resource set index, and the control channel resource index.

In some embodiments, in the case where the first type of search space and the second type of search space satisfy the second trigger condition, detecting or receiving the second type of search space is further included.

In some embodiments, in the case where the first type of search space and the second type of search space satisfy the second trigger condition, the second trigger condition includes at least one of the following. The second type of search space and the first type of search space are in different OFDM symbols. The second type of search space and the first type of search space are in different time slots. The second type of search space and the first type of search space are in different resource blocks. The second type of search space and the first type of search space are in different time instants. And the second type of search space and the first type of search space are in different carriers.

Embodiment Fourteen

Figure 16:
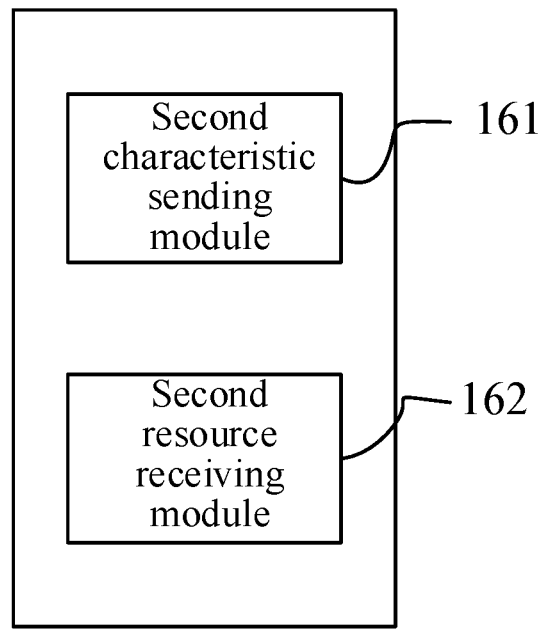
FIG. 16 is a schematic diagram illustrating composition of a channel configuration device provided by Embodiment Fourteen of the present invention.

Referring to FIG. 16, FIG. 16 is a schematic diagram illustrating composition of a channel configuration device provided by the present embodiment. The device includes: a second characteristic sending module 161 configured to configure a second channel characteristic assumption of a control channel resource set and send the second channel characteristic assumption of the control channel resource set; and a second resource receiving module 162 configured to receive the uplink control channel associated with the uplink control channel resources sent by the first communication node according to the channel characteristic assumption of the uplink control channel resources.

In some embodiment, in the case where different N uplink control channel resources are simultaneously sent, the N uplink control channel resources are sent through at least one of the following channel characteristic assumption of the uplink control channel resources. Channel characteristic assumption of the uplink control channel resources of the lowest, highest or specific uplink control channel resource index; channel characteristic assumption of the uplink control channel resources under the carrier or primary carrier of the lowest or highest carrier index; channel characteristic assumption of the uplink control channel resource under the BWP or the activated BWP under the lowest or highest BWP index; channel characteristic assumption of uplink control channel resources of the lowest or highest or specific uplink control channel resource index under the carrier or primary carrier of the lowest or highest carrier index; and channel characteristic assumption of uplink control channel resources of the lowest or highest or specific uplink control channel resource index under the BWP or the activated BWP under the lowest or highest BWP index.

In some embodiment, the simultaneously sending the N different uplink control channel resources includes the simultaneously sending the N different uplink control channel resources in at least one of the following: a same Orthogonal Frequency Division Multiplexing (OFDM) symbol, a same time slot, a same resource block, overlapped monitoring windows associated with the N different uplink control channel resources, or all being valid at the same time.

In some embodiments, the channel characteristic assumption includes the spatial relation information or the spatial relation.

In some embodiments, a priority of at least one of an uplink reference signal, an uplink data channel or an uplink control channel in which the uplink reference signal, the uplink data channel and the uplink control channel are scheduled by a common search space is higher than priorities of an uplink reference signal, an uplink data channel and an uplink control channel that are scheduled by a user-specific search space.

In some embodiments, channel characteristic hypotheses of the uplink reference signal, uplink data channel and uplink control channel that have the lower priorities are determined according to the at least one of the uplink reference signal, the uplink data channel or the uplink control channel that has the higher priority.

Embodiment Fifteen

Figure 17:
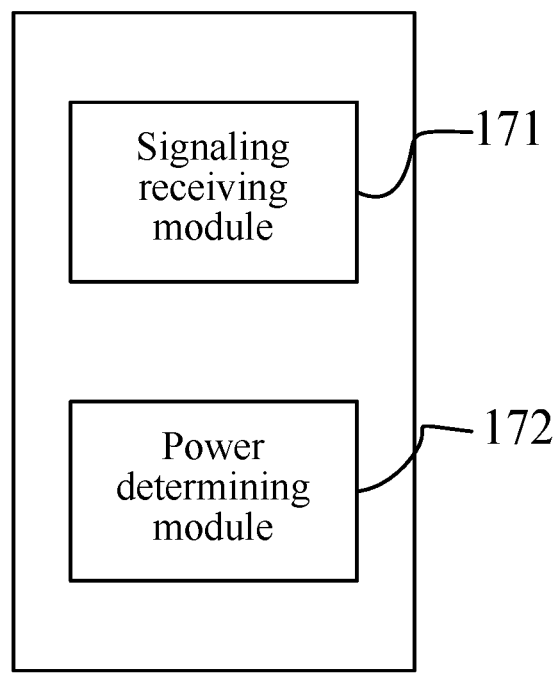
FIG. 17 is a schematic diagram illustrating composition of a channel power control device provided by Embodiment Fifteen of the present invention.

Referring to FIG. 17, FIG. 17 is a schematic diagram illustrating composition of a channel power control device provided by the present embodiment. The device includes: a signaling receiving module 171 configured to receive the first type of MAC-CE signaling sent by the second communication node; and a power determining module 172 configured to determine the power control parameter of the PUSCH according to the first type of MAC-CE signaling.

In some embodiment, in the case where different N uplink control channel resources are simultaneously sent, the N uplink control channel resources are transmitted through at least one of the following channel characteristic assumption of the uplink control channel resources. Channel characteristic assumption of the uplink control channel resources of the lowest, highest or specific uplink control channel resource index; channel characteristic assumption of the uplink control channel resources under the carrier or primary carrier of the lowest or highest carrier index; channel characteristic assumption of the uplink control channel resource under the BWP or the activated BWP under the lowest or highest BWP index; channel characteristic assumption of uplink control channel resources of the lowest or highest or specific uplink control channel resource index under the carrier or primary carrier of the lowest or highest carrier index; and channel characteristic assumption of uplink control channel resources of the lowest or highest or specific uplink control channel resource index under the BWP or the activated BWP under the lowest or highest BWP index.

In some embodiment, the simultaneously sending the N different uplink control channel resources includes the simultaneously sending the N different uplink control channel resources in at least one of the following: a same Orthogonal Frequency Division Multiplexing (OFDM) symbol, a same time slot, a same resource block, overlapped monitoring windows associated with the N different uplink control channel resources, or all being valid at the same time.

In some embodiments, the channel characteristic assumption includes the spatial relation information or the spatial relation.

In some embodiments, a priority of at least one of an uplink reference signal, an uplink data channel or an uplink control channel in which the uplink reference signal, the uplink data channel and the uplink control channel are scheduled by a common search space is higher than priorities of an uplink reference signal, an uplink data channel and an uplink control channel that are scheduled by a user-specific search space.

In some embodiments, channel characteristic hypotheses of the uplink reference signal, uplink data channel and uplink control channel that have the lower priorities are determined according to the at least one of the uplink reference signal, the uplink data channel or the uplink control channel that has the higher priority.

Embodiment Sixteen

Figure 18:
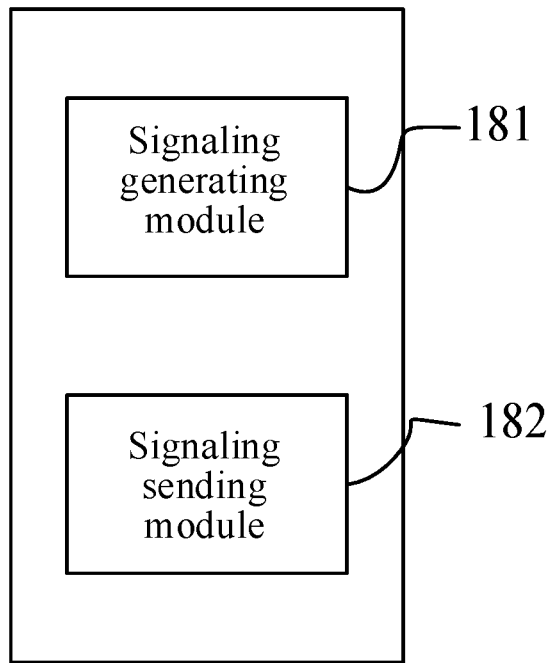
FIG. 18 is a schematic diagram illustrating composition of a channel power control device provided by Embodiment Sixteen of the present invention.

Referring to FIG. 18, FIG. 18 is a schematic diagram illustrating composition of a channel power control device provided by the present embodiment. The device includes: a signaling generating module 181 configured to generate the first type of MAC-CE signaling; where the first type of MAC-CE signaling is used to determine the power control parameters of the PUSCH; and a signaling sending module 182 configured to transmit the first type of MAC-CE signaling to the first communication node.

In some embodiment, the first type of MAC-CE signaling is used to activate or deactivate the semi-persistent SRS, or to configure the spatial relation of the associated SRS; and the SRS is used in the non-codebook mode or the codebook mode.

In some embodiment, the determining the power control parameter of the PUSCH includes at least one of the following: determining the open-loop power control parameter of the PUSCH according to the first type of MAC-CE signaling; determining a PL reference signal of the PUSCH according to the first type of MAC-CE signaling; determining the closed-loop power control index of the PUSCH according to the first type of MAC-CE signaling; and resetting the closed-loop power control value of the PUSCH.

In some embodiments, the open-loop power control parameters include the alpha and the target power p0.

In some embodiments, the first type of MAC-CE signaling includes at least one of the following: the first type of MAC-CE signaling, carrying the element index in the open-loop power control parameter set associated with the SRI code value in the DCI, or carrying the open-loop power control parameter value associated with the SRI field in the DCI; the first type of MAC-CE signaling, carrying the element index in the set of PL reference signals associated with the SRI code value in the DCI, or carrying the reference signal reference signal index associated with the SRI field in the DCI; and the first type of MAC-CE signaling, carrying the closed-loop power control index associated with the SRI code value in the DCI.

In some embodiment, the following are further included: determining, the open-loop power control parameter of the PUSCH, by the element index in the open-loop power control parameter set associated with the SRI code value in the DCI configured by RRC; determining the reference signal reference signal of the PUSCH, by the downlink reference signal associated with the spatial parameter of the semi-persistent SRS associated with the SRI in the DCI; and determining, the open-loop power control parameter of the PUSCH, by the closed-loop power control index associated with the SRI code value in the DCI configured by RRC.

Embodiment Seventeen

Figure 19:
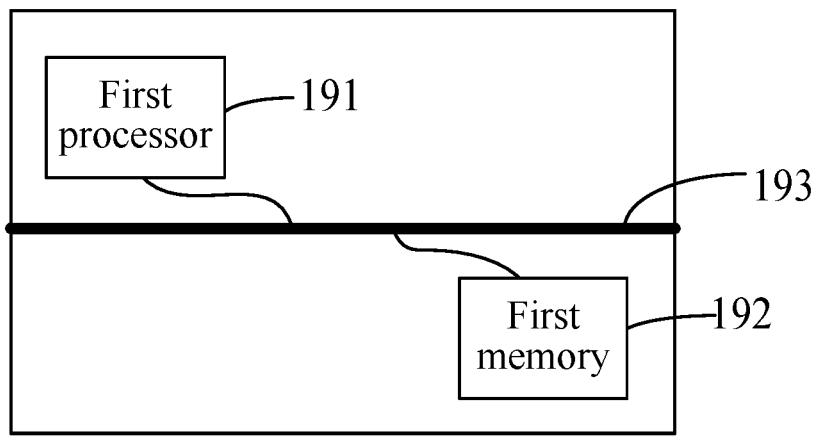
FIG. 19 is a schematic diagram of composition of a user equipment provided by Embodiment Seventeenth of the present invention.

Referring to FIG. 19, FIG. 19 is a schematic diagram of composition of a user equipment provided by the present embodiment. The user equipment includes: a first processor 191, a first memory 192 and a first communication bus 193. The first communication bus 193 is configured to implement connection and communication between the first processor 191 and the first memory 192. The first processor 191 is configured to execute a computer program stored in the first memory 192 to implement the channel configuration method, or the channel power control method described in a respective embodiment of the present invention, which are not described in detail here.

Embodiment Eighteen

Figure 20:
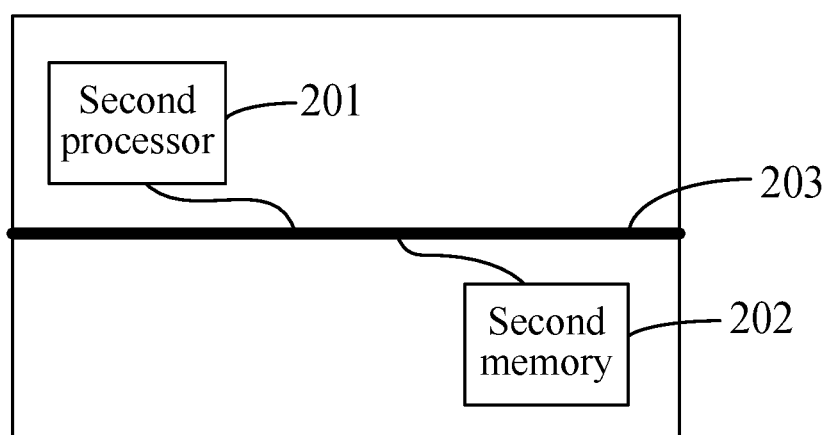
FIG. 20 is a schematic diagram of composition of a base station provided by Embodiment Eighteen of the present invention.

Referring to FIG. 20, FIG. 20 is a schematic diagram of composition of a base station provided by the present embodiment. The base station includes: a second processor 201, a second memory 202 and a second communication bus 203. The second communication bus 203 is configured to implement connection and communication between the second processor 201 and the second memory 202. The second processor 201 is configured to execute a computer program stored in the second memory 202 to implement the channel configuration method, or the channel power control method described in a respective embodiment of the present invention, which are not described in detail here.

Embodiment Nineteen

The present embodiments provide a computer-readable storage medium. The computer-readable storage medium is configured to store one or more computer programs, where the one or more computer programs are executable by one or more processors to implement the above-mentioned channel configuration method described in a respective embodiment, or the channel power control method described in a respective embodiment, which are not described in detail here.

Apparently, it should be understood by those skilled in the art that respective modules or steps in the present application may be implemented by a general-purpose computing apparatus, the modules or steps may be concentrated on a single computing apparatus or distributed on a network composed of multiple computing apparatuses. Optionally, the modules or steps may be implemented by program codes executable by the computing apparatuses, so that the modules or steps may be stored in a storage medium (such as a read-only memory (ROM)/random access memory (RAM), a magnetic disk or an optical disk) and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. Therefore, the present application is not limited to any specific combination of hardware and software.

The above content is a further detailed description of the present application in conjunction with the specific embodiments, and the specific implementation of the present application is not limited to the description. For those skilled in the art to which the present disclosure pertains, a number of simple deductions or substitutions may be made without departing from the concept of the present application and should fall within the scope of the present application.

What is claimed is:

1. A channel power control method, comprising:
   receiving, by a user equipment, a Radio Resource Control (RRC) signaling from a communication node configuring a set of path loss (PL) reference signals;
   receiving, by the user equipment, a Media Access Control-Control Element (MAC-CE) signaling from the communication node, wherein the MAC-CE signaling includes an index indicating a path loss (PL) reference signal of a Physical Uplink Shared Channel (PUSCH) in the set of PL reference signals;
   determining, by the user equipment, the PL reference signal of the PUSCH according to the index in the MAC-CE signaling; and
   determining, by the user equipment, a transmission power for a transmission on the PUSCH based on the PL reference signal.

2. The method of claim 1, wherein the index indicating the PL reference signal is associated with a sounding reference signal resource indicator (SRI) code value in a downlink control information (DCI) signaling.

3. A non-transitory computer program product having code stored thereon, the code, when executed by a processor, causing the processor to implement the method of claim 1.

4. The non-transitory computer program product of claim 3, wherein the index indicating the PL reference signal is associated with a sounding reference signal resource indicator (SRI) code value in a downlink control information (DCI) signaling.

5. A channel power control method, comprising:
   transmitting, by a communication node, a Radio Resource Control (RRC) signaling to a user equipment configuring a set of path loss (PL) reference signals;
   determining, by the communication node, a Media Access Control-Control Element (MAC-CE) signaling that includes an index indicating a path loss (PL) reference signal of a Physical Uplink Shared Channel (PUSCH) in the set of PL reference signals; and
   transmitting, by the communication node, the MAC-CE signaling to the user equipment to enable the user equipment to determine a transmission power for a transmission on the PUSCH based on the PL reference signal.

6. The method of claim 5, wherein the index indicating the PL reference signal is associated with a sounding reference signal resource indicator (SRI) code value in a downlink control information (DCI) signaling.

7. A non-transitory computer program product having code stored thereon, the code, when executed by a processor, causing the processor to implement the method of claim 5.

8. The non-transitory computer program product of claim 7, wherein the index indicating the PL reference signal is associated with a sounding reference signal resource indicator (SRI) code value in a downlink control information (DCI) signaling.

9. A communication apparatus, comprising a processor configured to:
  receive a Radio Resource Control (RRC) signaling from a communication node configuring a set of path loss (PL) reference signals;
  receive a Media Access Control-Control Element (MAC-CE) signaling from the communication node, wherein the MAC-CE signaling includes an index indicating a path loss (PL) reference signal of a Physical Uplink Shared Channel (PUSCH) in the set of PL reference signals;
  determine the PL reference signal of the PUSCH according to the index in the MAC-CE signaling; and
  determine a transmission power for a transmission on the PUSCH based on the PL reference signal.

10. The apparatus of claim 9, wherein the index indicating the PL reference signal is associated with a sounding reference signal resource indicator (SRI) code value in a downlink control information (DCI) signaling.

11. A communication apparatus, comprising a processor configured to:
  transmit a Radio Resource Control (RRC) signaling to a user equipment configuring a set of path loss (PL) reference signals;
  determine a Media Access Control-Control Element (MAC-CE) signaling that includes an index indicating a path loss (PL) reference signal of a Physical Uplink Shared Channel (PUSCH) in the set of PL reference signals; and
  transmit the MAC-CE signaling to the user equipment to enable the user equipment to determine a transmission power for a transmission on the PUSCH based on the PL reference signal.

12. The apparatus of claim 11, wherein the index indicating the PL reference signal is associated with a sounding reference signal resource indicator (SRI) code value in a downlink control information (DCI) signaling.

\* \* \* \* \*